United States Patent
Ke et al.

(10) Patent No.: US 11,997,751 B2
(45) Date of Patent: May 28, 2024

(54) METHOD FOR SUPPORTING UE ASSOCIATION AND COMMUNICATIONS DEVICE

(71) Applicant: VIVO MOBILE COMMUNICATION CO., LTD., Guangdong (CN)

(72) Inventors: Xiaowan Ke, Guangdong (CN); Wei Bao, Guangdong (CN); Fei Yang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 418 days.

(21) Appl. No.: 17/377,516

(22) Filed: Jul. 16, 2021

(65) Prior Publication Data
US 2021/0345089 A1    Nov. 4, 2021

Related U.S. Application Data

(63) Continuation of application No. PCT/CN2020/072744, filed on Jan. 17, 2020.

(30) Foreign Application Priority Data

Jan. 18, 2019    (CN) .......................... 201910057171.0

(51) Int. Cl.
| | | |
|---|---|---|
| *H04W 8/18* | (2009.01) | |
| *H04W 8/24* | (2009.01) | |
| *H04W 48/18* | (2009.01) | |
| *H04W 48/20* | (2009.01) | |

(Continued)

(52) U.S. Cl.
CPC ............. *H04W 8/183* (2013.01); *H04W 8/24* (2013.01); *H04W 48/18* (2013.01); *H04W 48/20* (2013.01); *H04W 68/02* (2013.01); *H04W 88/06* (2013.01)

(58) Field of Classification Search
None
See application file for complete search history.

(56) References Cited

U.S. PATENT DOCUMENTS

| | | |
|---|---|---|
| 2009/0088211 A1 | 4/2009 | Kim |
| 2013/0329639 A1 | 12/2013 | Wietfeldt et al. |

(Continued)

FOREIGN PATENT DOCUMENTS

| | | |
|---|---|---|
| CN | 102083200 A | 6/2011 |
| CN | 103987099 A | 8/2014 |

(Continued)

OTHER PUBLICATIONS

3GPP, 3rd Generation Partnership Project; Technical Specification Group Services and System Aspects; Study on the security aspects of the next generation system (Release 14), 3GPP TR 33.899 V0.6.1 (Feb. 2017), Feb. 2017.

*Primary Examiner* — Adolf Dsouza
(74) *Attorney, Agent, or Firm* — Price Heneveld LLP (57) ABSTRACT

A method for supporting UE association which is applied to a first communications device includes: determining first information, where the first information includes at least one of the following: device identification information, related information of second UE, information of a core network CN network element of second UE; and the second UE is in an association relationship with first UE; and executing a first related operation according to the first information.

20 Claims, 5 Drawing Sheets

(51) Int. Cl.
    *H04W 68/02*     (2009.01)
    *H04W 88/06*     (2009.01)

(56) References Cited

U.S. PATENT DOCUMENTS

| | | | |
|---|---|---|---|
| 2015/0004973 A1* | 1/2015 | Gude | H04W 52/0216 |
| | | | 455/435.2 |
| 2016/0105864 A1 | 4/2016 | Guo | |
| 2017/0079059 A1* | 3/2017 | Li | H04W 16/02 |
| 2018/0213392 A1 | 7/2018 | Ni et al. | |

FOREIGN PATENT DOCUMENTS

| | | |
|---|---|---|
| CN | 104396330 A | 3/2015 |
| CN | 104581992 A | 4/2015 |
| CN | 105072706 A | 11/2015 |
| CN | 108696857 A | 10/2018 |
| CN | 109041220 A | 12/2018 |
| CN | 109151807 A | 1/2019 |
| CN | 109195197 A | 1/2019 |
| KR | 20090032678 A | 4/2009 |

\* cited by examiner

METHOD FOR SUPPORTING UE ASSOCIATION AND COMMUNICATIONS DEVICE

CROSS-REFERENCE TO RELATED APPLICATION

This application is continuation application of PCT International Application No. PCT/CN2020/072744 filed on Jan. 17, 2020, which claims priority to Chinese Patent Application No. 201910057171.0, filed on Friday, Jan. 18, 2019 in China, the disclosures of which are incorporated in their entireties by reference herein.

TECHNICAL FIELD

Embodiments of the present disclosure relate to the field of wireless communications technologies, and in particular, to a method for supporting UE association and a communications device.

BACKGROUND

In the current network, the use of a multi-card terminal is becoming increasingly common. A multi-card terminal may have two or more subscriber identity module (Subscriber Identity Module, SIM) cards. However, due to the lack of inter-network negotiation, the user experience of the multi-card terminal is not optimized enough. For that reason, how to resolve the problem of the multi-card terminal and improve the user experience of the multi-card terminal is an urgent technical problem to be resolved at present.

SUMMARY

According to a first aspect, an embodiment of the present disclosure provides a method for supporting UE association, which is applied to a first communications device, and includes:
  determining first information, where the first information includes at least one of the following: device identification information, related information of second UE, information of a CN network element of second UE; and the second UE is in an association relationship with first UE; and
  executing a first related operation according to the first information.

According to a second aspect, an embodiment of the present disclosure provides a method for supporting UE association, which is applied to a second communications device, and includes:
  sending device information of a first device;
  where the device information of the first device includes at least one of the following:
  a terminal device identity of the first device and UE identification information corresponding to a terminal device identity.

According to a third aspect, an embodiment of the present disclosure provides a method for supporting UE association, which is applied to a third communications device, and includes:
  obtaining first information, where the first information includes at least one of the following: device identification information, related information of second UE, information of a CN network element of second UE; and the second UE is in an association relationship with first UE; and
  executing a second related operation according to the first information.

According to a fourth aspect, an embodiment of the present disclosure provides a method for supporting UE association, which is applied to a third communications device, and includes:
  receiving first information, where the first information includes at least one of the following: device identification information, related information of second UE, information of a CN network element of second UE; and the second UE is in an association relationship with first UE; and
  executing a third related operation according to the first information.

According to a fifth aspect, an embodiment of the present disclosure provides a communications device, where the communications device is a first communications device, including:
  a determining module, configured to determine first information, where the first information includes at least one of the following: device identification information, related information of second UE, information of a CN network element of second UE; and the second UE is in an association relationship with first UE; and
  a first execution module, configured to execute a first related operation according to the first information.

According to a sixth aspect, an embodiment of the present disclosure provides a communications device, where the communications device is a second communications device, including:
  a first sending module, configured to send device information of a first device;
  where the device information of the first device includes at least one of the following:
  a terminal device identity of the first device and UE identification information corresponding to a terminal device identity.

According to a seventh aspect, an embodiment of the present disclosure provides a communications device, where the communications device is a third communications device, including:
  an obtaining module, configured to obtain first information, where the first information includes at least one of the following: device identification information, related information of second UE, information of a CN network element of second UE; and the second UE is in an association relationship with first UE; and
  a second execution module, configured to execute a second related operation according to the first information.

According to an eighth aspect, an embodiment of the present disclosure provides a communications device, where the communications device is a fourth communications device, including:
  a receiving module, configured to receive first information, where the first information includes at least one of the following: device identification information, related information of second UE, information of a CN network element of second UE; and the second UE is in an association relationship with first UE; and
  a third execution module, configured to execute a third related operation according to the first information.

According to a ninth aspect, an embodiment of the present disclosure provides a communications device, where the communications device includes a processor, a memory, and a program that is stored in the memory and executable on the processor, and when the program is executed by the processor, steps of the method for supporting UE association according to the first aspect are implemented, or steps of the method for supporting UE association according to the second aspect are implemented, or steps of the method for supporting UE association according to the third aspect are implemented, or steps of the method for supporting UE association according to the fourth aspect are implemented.

According to a tenth aspect, an embodiment of the present disclosure provides a computer-readable storage medium, where the computer-readable storage medium stores a program, and when the program is executed by a processor, steps of the method for supporting UE association according to the first aspect are implemented, or steps of the method for supporting UE association according to the second aspect are implemented, or steps of the method for supporting UE association according to the third aspect are implemented, or steps of the method for supporting UE association according to the fourth aspect are implemented.

DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of the present disclosure mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The technology described in this specification is not limited to the fifth-generation (5th-generation, 5G) system and subsequent evolved communication systems or LTE/LTE-advanced (LTE-Advanced, LTE-A) systems, and may also be applied to various wireless communication systems such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), and single-carrier frequency-division multiple access (Single-carrier Frequency-Division Multiple Access, SC-FDMA) systems, and other systems.

The terms "system" and "network" are usually used interchangeably. The CDMA system can implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system can implement radio technologies such as the global system for mobile communications (Global System for Mobile Communication, GSM). The OFDMA system can implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are parts of a universal mobile telecommunications system (Universal Mobile Telecommunications System, UMTS). LTE and more advanced LTE (such as LTE-A) are new UMTS versions that use E-UTRA. UTRA, E-UTRA, UMTS, LTE, LTE-A, and GSM are described in a document of an organization named "3rd Generation Partnership Project" (3rd Generation Partnership Project, 3GPP). CDMA2000 and UMB are described in a document of an origination named "3rd Generation Partnership Project 2" (3GPP2). The technology described in the present disclosure may also be used in the foregoing system and radio technology, and may also be used in another system and radio technology.

To better understand the embodiments of the present disclosure, the following technical points are first described:

A multi-card terminal refers to a device on which there are two or more SIM cards. The SIM card may be an electronic SIM card or a physical SIM card. From the perspective of network, a same device and different SIM cards constitute different UE.

In order to optimize the user experience of a multi-card terminal, the following problems need to be resolved:

Problem 1: SIM cards in a multi-card terminal may belong to a same operator or different operators. For a terminal with multiple cards of a same operator, the experience of the terminal may be optimized through negotiation between networks. However, the operator currently regards a multi-card terminal as multiple pieces of user equipment (User Equipment, UE). Moreover, terminal device identities (such as IMEI) corresponding to different card slots in a current multi-card terminal are different. For that reason, how to associate multiple pieces of UE on one device needs to be resolved.

Problem 2: paging conflict in a same operator. Alternatively, if a network on a UE side is in a connected state and a voice mode, and the other side is in an idle state, the UE cannot listen to paging of a network on the other side.

Figure 1:
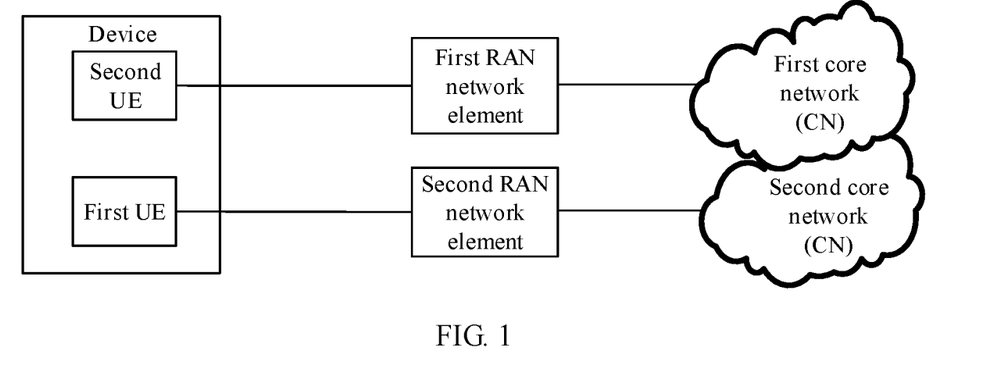
FIG. 1 is a schematic architectural diagram of a wireless communications system according to an embodiment of the present disclosure.

FIG. 1 is a schematic structural diagram of a wireless communications system according to an embodiment of the present disclosure. As shown in FIG. 1, first UE and second UE are configured on one device, and the second UE may be one or more pieces of UE different from the first UE. The one device may be configured with multiple SIM cards. The first UE may be UE indicated by a UE identity of a first SIM card, and the second UE may be UE indicated by a UE identity of a second SIM card. The first UE is connected to a first radio access network (Radio Access Network, RAN) network element, and camps on a cell under the first RAN network element, or a first RAN network element stores context of the first UE. The second UE is connected to a second RAN network element, and camps on a cell under the second RAN network element, or a second RAN network element stores context of the second UE.

The first UE registers with a first core network (Core Network, CN). The second UE registers with a second CN. The first CN and the second CN may be a same CN. The first UE registers with a first CN network element. The second UE registers with a second CN network element. The first CN network element and the second CN may be a same CN network element. The first CN network element and the second CN network element may belong to a same CN or different respective CNs.

A wireless communication network accessed by the first UE and the second UE may be a same wireless communication network or different wireless communication networks.

Optionally, obtaining may be understood as obtaining from a configuration, receiving, receiving by using a request, obtaining through self-learning, obtaining through derivation based on information that is not received, or obtaining after processing based on received information. This may be specifically determined based on an actual requirement, and is not limited in the embodiments of the present disclosure. For example, when specific capability indication information sent by a device is not received, it may be deduced that the device does not support the capability.

Optionally, sending may include broadcasting, broadcasting in a system message, and returning after responding to a request.

In an embodiment of the present disclosure, an NG interface may also be referred to as an S1 interface or an N2 interface, the naming of which is not limited.

In an embodiment of the present disclosure, the wireless communication network may be at least one of the following: a public network, a non-public network; or a first network may be a non-public network.

In an embodiment of the present disclosure, a non-public network is short for a non-public network. The non-public network may be referred to as one of the following: a non-public communication network. The non-public network may include at least one of the following deployment manners: a physical non-public network, a virtual non-public network, and a non-public network implemented in the public network. In an implementation manner, the non-public network is a closed access group (Closed Access Group, CAG). One CAG may include a group of terminals.

In an embodiment of the present disclosure, the non-public network may include or be referred to as a private network. The private network may be referred to as one of the following: a private communication network, a private network, a local area network (Local Area Network, LAN), a private virtual network (Private Virtual Network, PVN), an isolated communication network, a dedicated communication network, or another name. It should be noted that a naming manner is not specifically limited in the embodiments of the present disclosure.

In an embodiment of the present disclosure, the public network is the same name as the public network. The public network may be referred to as one of the following: a public communication network or another name. It should be noted that a naming manner is not specifically limited in the embodiments of the present disclosure.

In an optional embodiment of the present disclosure, the communications device may include at least one of the following: a communication network element and a terminal.

In an embodiment of the present disclosure, a communication network element may include at least one of the following: a network element of a core network and a network element of a wireless access network.

In the embodiments of the present disclosure, the network element of a core network (CN network element) may include but is not limited to at least one of the following: a core network device, a core network node, a core network function, a network element of a core network, a mobility management entity (Mobility Management Entity, MME), an access management function (Access Management Function, AMF), a session management function (Session Management Function, SMF), a user plane function (User Plane Function, UPF), a serving gateway (serving GW, SGW), a PDN gateway (PDN Gateway, PDN gateway), a policy control function (Policy Control Function, PCF), a policy and charging rules function (Policy and Charging Rules Function, PCRF) unit, a serving GPRS support node (Serving GPRS Support Node, SGSN), a gateway GPRS support node (Gateway GPRS Support Node, GGSN), and an application function (Application Function).

In the embodiments of the present disclosure, the RAN network element may include but is not limited to at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved NodeB (evolved NodeB, eNB), a 5G base station (gNB), a radio network controller (Radio Network Controller, RNC), a NodeB (NodeB), a non-3GPP interworking function (Non-3GPP Inter Working Function, N3IWF), an access controller (Access Controller, AC) node, an access point (Access Point, AP) device, a wireless local area network (Wireless Local Area Networks, WLAN) node, and N3IWF.

The base station may be a base transceiver station (BTS, Base Transceiver Station) in GSM or CDMA, a NodeB (NodeB) in WCDMA, an evolved NodeB (eNB or e-NodeB, evolutional NodeB) in LTE, or a 5G gNodeB (gNB), which is not limited in the embodiment of the present disclosure.

In an optional embodiment of the present disclosure, the UE may include at least one of the following: a subscriber (subscription, or Subscriber), a SIM card, a subscriber corresponding to a SIM card, UE associated with a SIM card, a terminal device, a terminal device and a subscriber, a terminal device and a SIM card.

In an optional implementation manner, the UE is a subscriber. One terminal device may be configured with multiple subscribers. The subscriber may be represented by a SIM (Subscriber Identity Module) card. One SIM card corresponds to one subscriber of one network. A SIM card stores an identity of a subscriber, that is, an identity of UE, such as a Subscription Permanent Identifier (Subscription Permanent Identifier, SUPI), or an International Mobile Subscription Identity (International Mobile Subscription Identity, IMSI). Therefore, when one terminal device is inserted with multiple SIM cards or configured with information of multiple electronic SIM cards, the terminal device and different subscribers may form different UE.

In another implementation manner, the UE is a terminal composed of a terminal device and a subscriber.

In another embodiment manner, the UE is a terminal device.

In another embodiment manner, the UE is a SIM card or a subscriber corresponding to a SIM card.

In another embodiment manner, the UE is UE corresponding to a SIM card.

In another embodiment manner, the UE is a SIM card.

In another embodiment manner, the UE is a terminal composed of a terminal device and a SIM card. When there are multiple SIM cards on one terminal device, the terminal device may form multiple logical terminals with each card. The SIM card may be a card placed in a card slot of the terminal device, or an electronic card in the terminal device.

In an optional embodiment of the present disclosure, the SIM card may include one of the following: a SIM card, a universal subscriber identity module (Universal Subscriber Identity Module, USIM) card, an embedded subscriber identity module (Embedded Subscriber Identity Module, eSIM) card. The SIM card may also be named with another a name, which is not limited in the present disclosure.

In an optional embodiment of the present disclosure, a first device of first UE is a device where the first UE is located.

In an optional embodiment of the present disclosure, a first device may be referred to as a terminal device or a device may be referred to as a terminal device.

In an optional embodiment of the present disclosure, a terminal may include a relay supporting a terminal function and/or a terminal supporting a relay function. The terminal may also be referred to as a terminal device or user equipment (User Equipment, UE). The terminal may be a terminal side device such as a mobile phone, a tablet personal computer (Tablet Personal Computer), a laptop computer (Laptop Computer), a personal digital assistant (Personal Digital Assistant, PDA), a mobile Internet device (Mobile Internet Device, MID), a wearable device (Wearable Device), or an in-vehicle device. It should be noted that a specific type of the terminal is not limited in the embodiments of the present disclosure.

The following describes a method for supporting UE association in the embodiments of the present disclosure.

Figure 2:
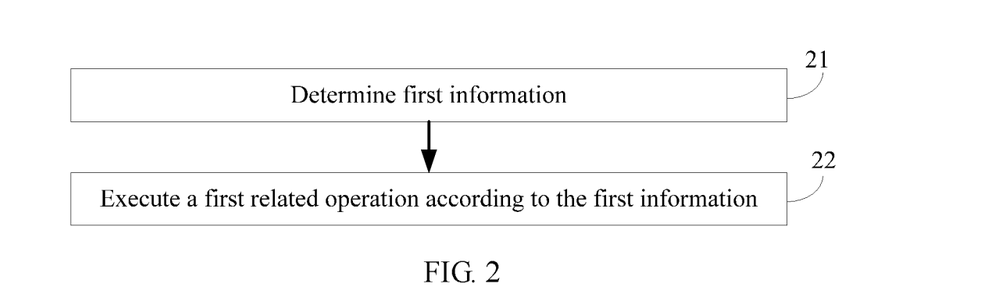
FIG. 2 is a flowchart of a method for supporting UE association according to an embodiment of the present disclosure.

Referring to FIG. 2, an embodiment of the present disclosure provides a method for supporting UE association, which is applied to a first communications device. The first communications device may be, but is not limited to, at least one of the following: UE, a first device, a terminal device, first UE, and a first card. As shown in FIG. 2, the method includes:

Step 21: determine first information.

The first information includes at least one of the following: device identification information, related information of second UE (user equipment), and information of a CN network element of second UE, where the second UE is in an association relationship with first UE.

That the second UE is in an association relationship with first UE may be understood that the first UE and the second UE are located on a same device (such as a first device). In an implementation manner, the first UE and the second UE are respective UE corresponding to different SIM cards on a same device; in another implementation manner, the first UE and the second UE are UE corresponding to different card slots on a same device.

(1) In this embodiment, optionally, the device identification information may include at least one of the following: a first terminal device identity and a second terminal device identity.

(2) In an implementation manner, the first terminal device identity may be a terminal device identity of the first UE. The second terminal device identity may be a terminal device identity associated with the first UE, such as another terminal device identity on a device where the first UE is located. It is not difficult to understand that each card slot on one terminal device may be configured with one terminal device identity. When a SIM card is inserted into the card slot, a terminal device identity of UE corresponding to the SIM card is a terminal device identity of the card slot. A terminal device identity corresponding to another card slot of the terminal device may be a terminal device identity associated with the UE corresponding to the SIM card.

(3) In another implementation manner, the first terminal device identity may be a terminal device identity of the first UE. The second terminal device identity may be a terminal device identity of the second UE. The first UE may have an associated terminal device identity but has no associated second UE. It is not difficult to understand, for example, there are two card slots on the terminal device, a first card slot is inserted with a first SIM card, and the first SIM card corresponds to the first UE. There is no SIM card inserted in the second card slot. There is no corresponding UE for a terminal device identity corresponding to the second card slot. In this case, the first UE has the associated terminal device identity of a terminal, but has no associated second UE.

In another implementation manner, the device identification information is a device identification information of a first device. The first terminal device identity and/or the second terminal device identity are/is a first terminal device identity and/or a second terminal device identity of the first device. The first device may be a device where the first UE is located, or the first device may be a device where both the first UE and the second UE are located.

Alternatively, the terminal device identity may include at least one of the following: an International Mobile Equipment Identity (International Mobile Equipment Identity, IMEI), an International Mobile station Equipment Identity and Software Version number (International Mobile station Equipment Identity and Software Version number, IMEISV), and a Permanent Equipment Identifier (Permanent Equipment Identifier, PEI). For example, the first terminal device identity is a first IMEI; and the second terminal device identity is a second IMEI.

Alternatively, the second UE associated with the first UE may be multiple pieces of UE. For example, a terminal device contains more than two pieces of UE. In the case that the second UE is multiple pieces of UE, the related information of the second UE is also multiple pieces of information.

Alternatively, the related information of the second UE may include at least one of the following: a terminal device identity of the second UE, a UE identity of the second UE, a temporary UE identity of the second UE, and an identity of a CN network element of the second UE, where the temporary UE identity of the second UE may include an identity of a CN network element of the second UE.

In an implementation manner, the UE identity includes at least one of the following: an International Mobile Subscriber Identification Identity (International Mobile Subscriber Identification Identity, IMSI), a Network Access Identifier (Network Access Identifier, NAI), a subscription permanent identifier (Subscription permanent identifier, SUPI), and a Subscription Concealed Identifier (Subscription Concealed Identifier, SUCI).

In an implementation manner, the temporary UE identity may include at least one of the following: a 5G Globally Unique Temporary UE Identity (5G Globally Unique Temporary UE Identity, 5G GUTI), a GUTI (Globally Unique Temporary UE Identity), an S-TMSI, an ng-S-TMSI, a 5G TMSI, and a TMSI. The 5G GUTI, GUTI, 5G-S-TMSI, and ng-S-TMSI may contain identification information of a CN network element and identification information of UE in the CN network element. The 5G TMSI and TMSI may be the identification information of the UE in the CN network element.

Optionally, information of the CN network element of the second UE may include at least one of the following: an address of the CN network element and an identity of the CN network element. The CN network element is, for example, an MME, or an AMF. The identity of the CN network element may include but is not limited to at least one of the following: a GUMMEI, a GUAMI, an MME group, an MMEC, an AMF group, an AMF Set ID, and an AMF pointer.

In an implementation manner, the first card is a SIM card. The SIM card may include at least one of the following: an electronic SIM card and a USIM card.

Step 22: execute a first related operation according to the first information.

Optionally, the executing a first related operation according to the first information may include at least one of the following:

sending the first information when the first UE accesses a network;

setting the identity of the CN network element of the first UE to an identity of a CN network element of the second UE when sending an identity of a CN network element of the first UE;

selecting a cell for the first UE, where the selected cell is a serving cell of the second UE; and selecting a serving network for the first UE, where the selected serving network is a serving network of the second UE; and the serving network is, for example, a public land mobile network (Public Land Mobile Network, PLMN) or a non public network (Non Public Network, NPN).

In an implementation manner, the sending the first information when the first UE accesses a network may include: sending device identification information of the first UE when the first UE accesses a network (for example, when the first UE initially accesses a network). It is not difficult to understand that in this embodiment, an association relationship between the first terminal device identity and the second terminal device identity may be set up, and then an association relationship between the first UE and the second UE may be set up according to an association relationship between the first UE and the first terminal device identity, and an association relationship between the second UE and the second terminal device identity.

Alternatively, in this embodiment, an association relationship between the first UE and the first terminal device identity, and an association relationship between the first UE and the second terminal device identity may be set up, and then an association relationship between the first UE and the second UE may be set up according to an association relationship between the second UE and the second terminal device identity.

In another implementation manner, the sending the first information when the first UE accesses a network may include: sending related information of the second UE when the first UE accesses a network (for example, when the first UE initially accesses a network), that is, the related information of the second UE associated with the first UE. It is not difficult to understand that in this case, an association relationship between the first UE and the second UE may be directly set up.

In an implementation manner, the sending related information of the second UE associated with the first UE when the first UE accesses a network may include: sending a message 5 by the first UE, where the message 5 contains the related information of the second UE associated with the first UE.

In an implementation manner, the process of the sending device identification information may include: receiving a first request first, and then sending the device identification information according to the received first request. In an implementation manner, the first request is received from a network.

Optionally, the first request includes an identity type requested.

In an implementation manner, in the case that the identity type indicates "all terminal device identities of a device" or "a first terminal device identity and a second terminal device identity", the first terminal device identity and the second terminal device identity are sent.

In another implementation manner, in the case that the identity type indicates "a terminal device identity" or "a first terminal device identity", the first terminal device identity is sent.

In another implementation manner, in the case that the identity type indicates "a second terminal device identity", the second terminal device identity is sent.

Optionally, the first request may include at least one of the following: identification information of the first UE, temporary identification information of the first UE, a first terminal device identity, and an identity type requested.

Optionally, the identity type includes at least one of the following: a terminal device identity (such as an IMEI, or an IMEISV), a first terminal device identity, a second terminal device identity, a first terminal device identity and a second terminal device identity, all terminal device identify of a device. The first device is a device where the first UE is located.

In an implementation manner, the sent device identification information may optionally be identification information of a device where the first UE is located. In another implementation manner, the sent device identification information may optionally be a second terminal device identity associated with the first terminal device identity.

In an implementation manner, an operation related to the user experience of the first UE and the second UE may be supported based on the association relationship between the first UE and the second UE, for example, selecting a same cell, a same serving network, or a same serving CN network element.

In an implementation manner, the process of sending the first information may include: receiving a first request first, and then sending the first information according to the received first request.

According to the embodiments of the present disclosure, on the one hand, an association relationship between a first terminal device identity and a second terminal device identity, and an association relationship between first UE and the first terminal device identity may be obtained, and when second UE accesses a network subsequently, an association relationship between the first UE and the second UE may be set up based on an association relationship between the second UE and the second terminal device identity; on the other hand, the association relationship between the first UE and the second UE may be directly set up by sending related information of the second UE associated with the first UE; furthermore, resolving a conflict between the first UE and the second UE can be based on the association relationship between the first UE and the second UE, thereby improving an operation related to the user experience of the first UE and the second UE.

Figure 3:
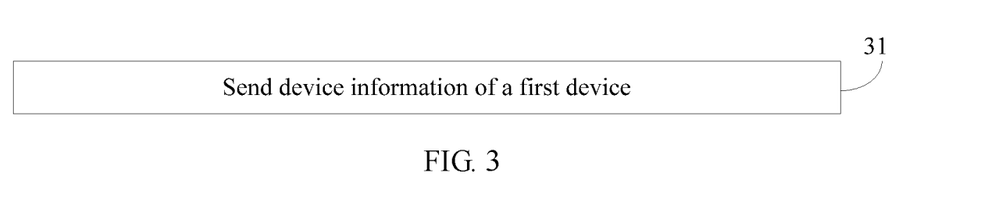
FIG. 3 is a flowchart of another method for supporting UE association according to an embodiment of the present disclosure.

Referring to FIG. 3, an embodiment of the present disclosure provides a method for supporting UE association, which is applied to a second communications device. The second communications device may be, but is not limited to, at least one of the following: an AF (such as an AF of a terminal device manufacturer. In an implementation manner, the AF of the terminal device manufacturer may be a background server of the terminal device manufacturer), a UDR, a UDM. As shown in FIG. 3, the method includes:

Step 31: Send device information of a first device.

The device information of the first device includes: a terminal device identity of the first device, and UE identification information corresponding to a terminal device identity.

In an implementation manner, there are multiple terminal device identify (greater than 1) of the first device. Each terminal device identity may have its own corresponding UE identification information.

It is not difficult to understand that a terminal manufacturer configures a terminal device identity for a terminal device to be delivered. For the terminal that supports multiple cards, the terminal manufacturer may configure a terminal device identity for each of the multiple cards separately. Therefore, one terminal device may have multiple terminal device identify. After a SIM card is inserted into a card slot, a terminal device identity of the card slot has a corresponding UE identity, and the UE identity is a UE identity corresponding to the inserted SIM card.

Specifically, UE identification information (such as a UE identity and/or a UE temporary identity) is as described in the embodiment in FIG. 2, which will no longer be repeated here.

Specifically, the terminal device identity is as described in the embodiment in FIG. 2, which will no longer be repeated here.

In an implementation manner, the process of sending device information of a first device may include: receiving a first request first, and then sending the device information of the first device according to the received first request.

Optionally, the first request includes an identity type requested.

In an implementation manner, in the case that the identity type indicates "all terminal device identify of a device" or "a first terminal device identity and a second terminal device identity", the first terminal device identity and the second terminal device identity are sent.

In another implementation manner, in the case that the identity type indicates "a terminal device identity" or "a first terminal device identity", the first terminal device identity is sent.

In another implementation manner, in the case that the identity type indicates "a second terminal device identity", the second terminal device identity is sent.

Optionally, the first request may include at least one of the following: identification information of the first UE, temporary identification information of the first UE, a first terminal device identity, and an identity type requested.

Optionally, the identity type includes at least one of the following: a terminal device identity (such as an IMEI, or an IMEISV), a first terminal device identity, a second terminal device identity, a first terminal device identity and a second terminal device identity, all terminal device identify of a device. The first device is a device where the first UE is located.

In an implementation manner, the sent device information of the first device may optionally be device identification information of the first device where the first UE is located. In another implementation manner, the sent device information of the first device may optionally be a second terminal device identity associated with the first terminal device identity.

Through this embodiment of the present disclosure, it is possible to support a network to obtain an association relationship between a first terminal device identity and a second terminal device identity, and when first UE accesses a network subsequently, the network can obtain an association relationship between the first UE and the first terminal device identity; when second UE accesses a network subsequently, the network can obtain an association relationship between the second UE and the second terminal device identity. It is not difficult to understand that the network can set up an association relationship between the first UE and the second UE based on the foregoing information, thereby supporting an operation related to optimization of the user experience of the first UE and the second UE.

Figure 4:
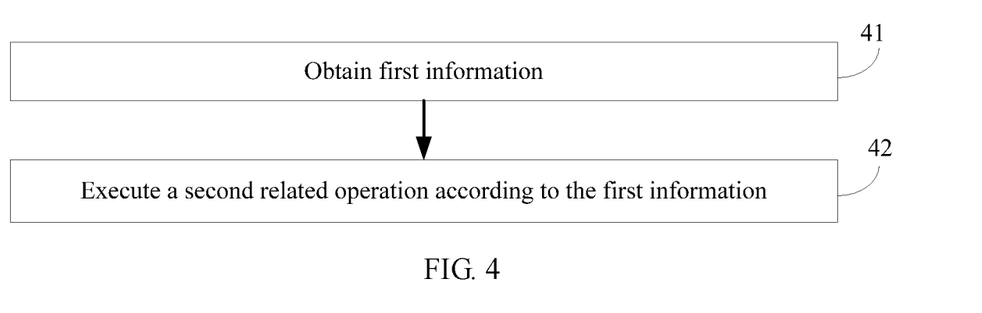
FIG. 4 is a flowchart of another method for supporting UE association according to an embodiment of the present disclosure.

Referring to FIG. 4, an embodiment of the present disclosure provides a method for supporting UE association, which is applied to a third communications device. The third communications device may be, but is not limited to, an RAN network element. As shown in FIG. 4, the method includes:

Step 41: Obtain first information;

The first information includes at least one of the following: device identification information, related information of second UE, information of a CN network element of second UE; and the second UE is in an association relationship with first UE.

That the second UE is in an association relationship with first UE may be understood that the first UE and the second UE are located on a same device. In an implementation manner, the first UE and the second UE are respective UE corresponding to different SIM cards on a same device; in another implementation manner, the first UE and the second UE are UE corresponding to different card slots on a same device.

It should be noted that the device identification information is as described in the embodiment in FIG. 2, which will no longer be repeated here.

The related information of the second UE is as described in the embodiment in FIG. 2, which will no longer be repeated here.

The information of the CN network element of the second UE is as described in the embodiment in FIG. 2, which will no longer be repeated here.

Step 42: Execute a second related operation according to the first information.

Optionally, the executing a second related operation may include at least one of the following:

selecting a CN network element for the first UE; and selecting a CN network element for the first UE, and sending information of the second UE to the selected CN network element.

In an implementation manner, the operation of selecting a CN network element for the first UE includes selecting a CN network element for the first UE, where the CN network element is the CN network element of the second UE. Through this embodiment of the present disclosure, it is possible to support a network to obtain an association relationship between first UE and second UE, thereby supporting an operation related to the user experience of the first UE and the second UE.

Figure 5:
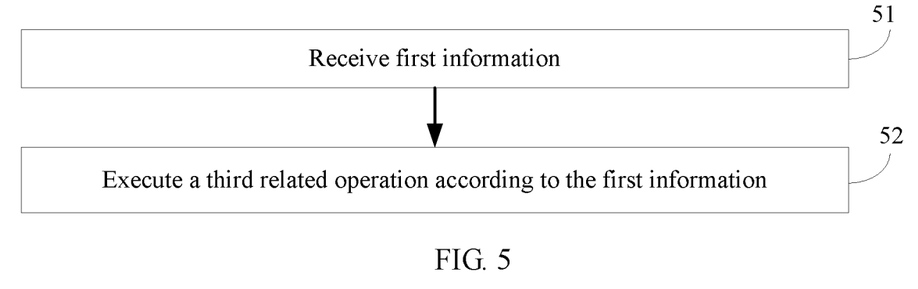
FIG. 5 is a flowchart of another method for supporting UE association according to an embodiment of the present disclosure.

Referring to FIG. 5, an embodiment of the present disclosure provides a method for supporting UE association, which is applied to a fourth communications device. The fourth communications device may be, but is not limited to, a first CN network element (such as an MME or AMF), a third CN network element (such as a UDM, or an HSS), an RAN network element. As shown in FIG. 5, the method includes:

Step 51: Receive first information.

The first information includes at least one of the following: device identification information, related information of second UE, information of a CN network element of second UE; and the second UE is in an association relationship with first UE.

That the second UE is in an association relationship with first UE may be understood that the first UE and the second UE are located on a same device. In an implementation manner, the first UE and the second UE are respective UE corresponding to different SIM cards on a same device; in another implementation manner, the first UE and the second UE are UE corresponding to different card slots on a same device.

It should be noted that the device identification information is as described in the embodiment in FIG. 2, which will no longer be repeated here.

The related information of the second UE is as described in the embodiment in FIG. 2, which will no longer be repeated here.

The information of the CN network element of the second UE is as described in the embodiment in FIG. 2, which will no longer be repeated here.

Step 52: Execute a third related operation according to the first information.

Optionally, the executing a third related operation may include at least one of the following:

saving the first information;

setting up an association relationship between the first UE and the second UE;

setting up an association relationship between the first UE and a second terminal device identity;

setting up an association relationship between the first UE and a CN network element of the second UE;

setting up an association relationship between a first terminal device identity and a second terminal device identity;

acquiring related information of the second UE, where the second UE is in an association relationship with the first UE;

acquiring information of a second CN network element serving the second UE;

determining whether there is a paging conflict between the first UE and the second UE; and sending the first information.

(1) Optionally, the fourth communications device is a first CN network element (such as an MME or AMF). The fourth communications device may send the first information to a first target end. In an implementation manner, the target end may include at least one of the following: a UDR, a UDM, an HSS, an RAN network element, and a PCF. The fourth communications device may obtain the first information from a source end. In an implementation manner, the source end includes at least one of the following: a first device, a UDM, an RAN network element, and an AF.

In an implementation manner, the fourth communications device may obtain information of the second UE, that is, the information of the second UE associated with the first UE, from a terminal, a UDM and/or an RAN network element.

In another implementation manner, the fourth communications device may obtain device identification information from a terminal, a UDM and/or an AF network element.

In another implementation manner, the fourth communications device may obtain the information of the CN network element of the second UE from a UDM.

In another implementation manner, in the case that the first CN network element registers UE with a UDM, the fourth communications device may obtain information of the CN network element of the second UE from the UDM.

(2) Optionally, the fourth communications device is a third CN network element (such as a UDM or an HSS). The fourth communications device may send the first information to a first target end. In an implementation manner, the target end may include at least one of the following: a first CN network element and a second CN network element. The fourth communications device may obtain the first information from a source end. In an implementation manner, the source end includes at least one of the following: a first CN network element and an AF.

(3) Optionally, the fourth communications device is an RAN network element. The fourth communications device may obtain the first information from a source end. In an implementation manner, the source end is optionally: a first CN network element.

In an implementation manner, obtaining the first information from a source end by the fourth communications device may include: receiving, by an RAN network element, an initial context to set up a request message, where the message includes first information.

In this embodiment, the first CN network element may be a CN network element serving the first UE; the second CN network element may be a CN network element serving the second UE. The first UE and the second UE may be UE on a same device.

Through this embodiment of the present disclosure, it is possible to support a network to set up an association relationship between first UE and second UE, set up an association relationship between the first UE and a second terminal device identity, set up an association relationship between the first UE and a CN network elements of the second UE, set up an association relationship between a first terminal device identity and the second terminal device identity, and the like, thereby supporting an operation related to the user experience of the first UE and the second UE.

Figure 6:
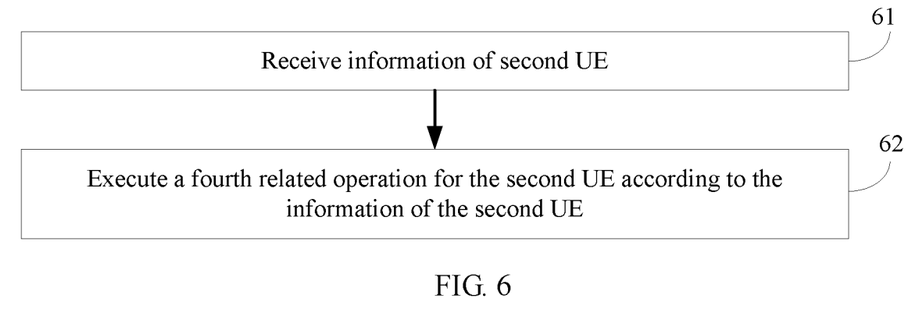
FIG. 6 is a flowchart of another method for supporting UE association according to an embodiment of the present disclosure.

Referring to FIG. 6, an embodiment of the present disclosure provides a method for supporting UE association, which is applied to a fifth communications device. The fifth communications device may be, but is not limited to, a second CN network element (such as an MME or AMF). As shown in FIG. 5, the method includes:

Step 61: Receive related information of second UE.

Step 62: Execute a fifth related operation according to the related information of the second UE.

Specifically, the related information of the second UE is as described in the embodiment in FIG. 2.

In an implementation manner, a second request is received from a first CN network element. The second request is used to request information of a CN network element of second UE. The second request includes related information of the second UE.

The first CN network element may be a CN network element of first UE. The first UE is in an association relationship with the second UE.

In this embodiment, the executing a fifth related operation may include: acquiring information of a CN network element of second UE.

In an implementation manner, the fifth communications device may obtain information of a CN network element of second UE from a UDM.

Optionally, a second CN network element may be a CN network element serving the second UE. The information of the CN network element is as described in the embodiment in FIG. 2, which will no longer be repeated here.

Optionally, the first UE and the second UE may be UE on a same device.

The method of supporting UE association in this embodiment of the present disclosure will be described with reference to specific application scenarios in FIG. 7 and FIG. 8.

Figure 7:
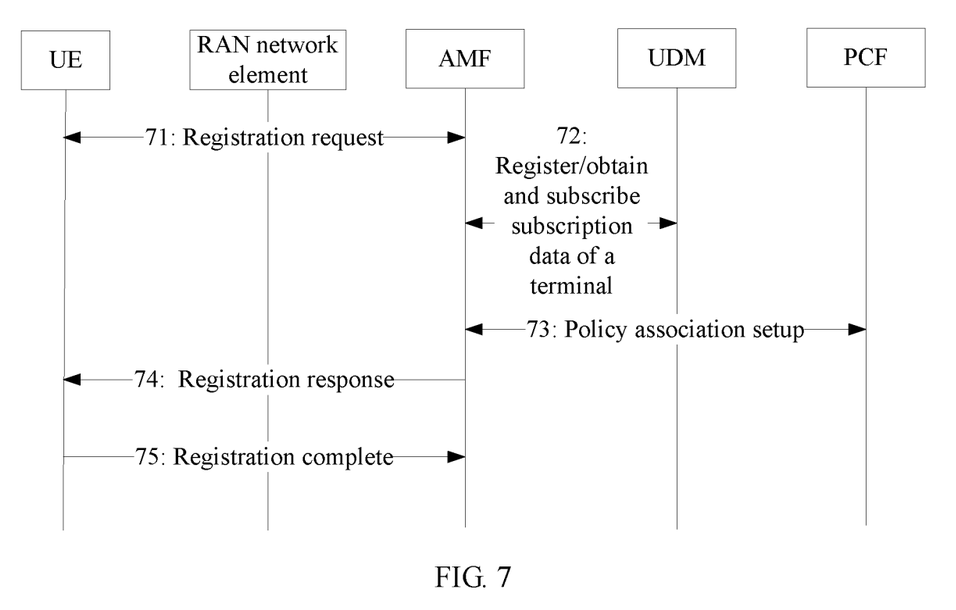
FIG. 7 is a flowchart of a UE request registration process according to a specific embodiment of the present disclosure.

Application scenario 1 according to an embodiment of the present disclosure:

Application scenario 1 according to the embodiment of the present disclosure takes first UE as an example, and mainly describes a UE requesting registration process, which includes the following steps, with reference to FIG. 7:

Step 71: The first UE sends a registration request message to a first CN network element (an AMF is taken as an example for description below), where the registration request message includes first information (specifically as described in the embodiment in FIG. 2).

Optionally, the AMF executes a third related operation according to the first information (specifically, as described in the embodiment in FIG. 5).

In an implementation manner, the first information includes device identification information (as described in the embodiment in FIG. 2). The first device is a device where the first UE is located.

In another implementation manner, the first information includes related information of second UE, that is, the related information of the second UE associated with the first UE (as described in the embodiment in FIG. 2).

Step 72: The AMF sends the first information to a third CN network element (UDM is taken as an example for description below). Specifically, the AMF registers a terminal with a Unified Data Manager (Unified Data Manager, UDM). The first information is included in a registration request.

Optionally, the UDM executes a third related operation according to the first information (specifically, as described in the embodiment in FIG. 5).

The AMF may also obtain and subscribe subscription data of the terminal.

The AMF may obtain information of a CN network element of the second UE from the UDM (as described in the embodiment in FIG. 2). The second UE is in an association relationship with the first UE (for example, the first UE and the second UE are located on a same device). Specifically, the AMF may obtain subscription data of the first UE from the UDM, where the subscription data of the first UE includes information of a CN network element of the second UE associated with the first UE.

Step 73: Set up a policy association between the AMF and PCF associated with the UE. The AMF may obtain a policy for the UE from the PCF.

Step 74: The AMF sends the first information to an RAN network element. Optionally, the RAN network element executes a third related operation according to the first information (specifically, as described in the embodiment in FIG. 5).

Specifically, the AMF returns a registration response message to the terminal.

Specifically, the AMF sends an initial context setup request message to the RAN network element. The initial context setup request message includes the registration response message and/or the first information.

Step 75: The first UE returns a registration completion message to the AMF.

Through this embodiment of the present disclosure, during a registration process of first UE, the first UE provides first information to a network, and the network can determine an association relationship between the first UE and second UE, or an association relationship between the first UE and a second terminal device identity, thereby making it possible to support an operation regarding multi-card optimization.

Figure 8A:
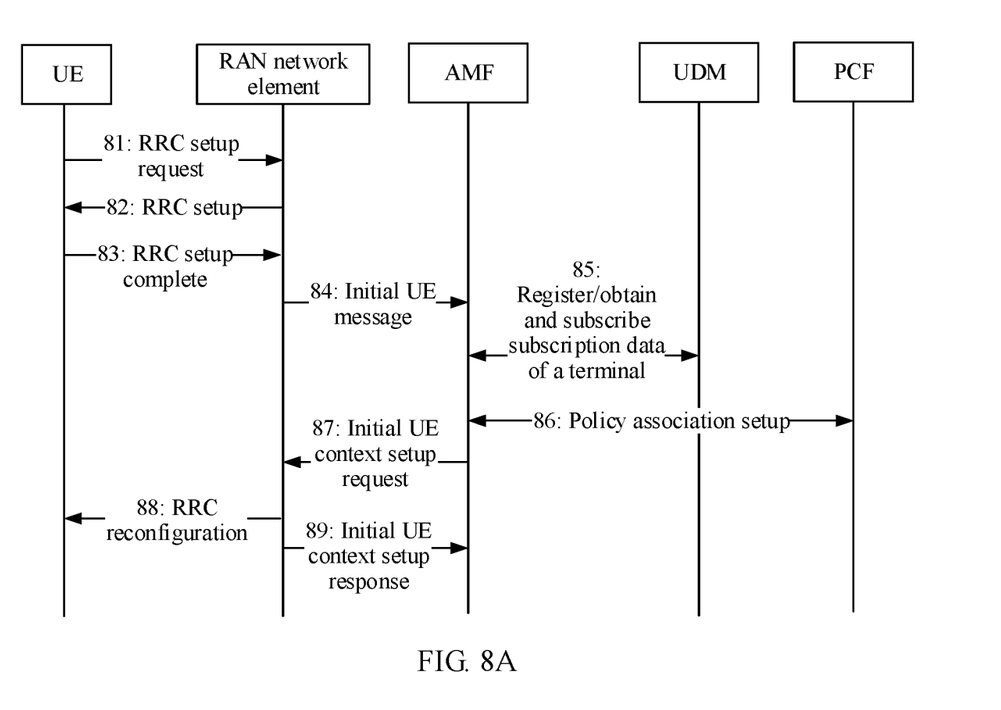
FIG. 8A is a flowchart of a UE initial access process according to a specific embodiment of the present disclosure.

Application scenario 2 according to an embodiment of the present disclosure:

Application scenario 2 according to the embodiment of the present disclosure takes first UE as an example, and mainly describes a UE initial access process, which includes the following steps, with reference to FIG. 8A:

Step 81: The first UE returns a radio resource control (Radio Resource Control, RRC) setup request message to an RAN network element.

Step 82: The RAN network element sends an RRC setup message to UE.

Step 83: The first UE sends an RRC setup completion message to the RAN network element. The RRC setup completion message includes first information (specifically, as described in the embodiment in FIG. 2).

In an implementation manner, the first information includes related information of second UE, that is, related information of the second UE associated with the first UE (as described in the embodiment in FIG. 2).

In another implementation manner, the first information includes information of a CN network element of the second UE (as described in the embodiment in FIG. 2).

Optionally, the RAN network element executes a second related operation according to the first information (specifically, as described in the embodiment in FIG. 4).

Step 84: The RAN network element sends an initial UE message to a first CN network element (AMF is taken as an example for description below). The initial UE message includes first information (specifically, as described in the embodiment in FIG. 2).

Optionally, the AMF executes a third related operation according to the first information (specifically, as described in the embodiment in FIG. 5).

In an implementation manner, the first information includes device identification information (as described in the embodiment in FIG. 2). The first device is a device where the first UE is located.

Step 85: The AMF sends the first information to a third CN network element (UDM is taken as an example for description below). Specifically, the AMF registers a terminal with the UDM. The first information is included in a registration request.

Optionally, the UDM executes a third related operation according to the first information (specifically, as described in the embodiment in FIG. 5).

The AMF may also obtain and subscribe subscription data of the terminal.

The AMF may obtain, from the UDM, information of a CN network element of the second UE associated with the first UE (as described in the embodiment in FIG. 2). Specifically, the AMF may obtain subscription data of the first UE, where the subscription data of the first UE includes information of a CN network element of the second UE associated with the first UE.

Step 86: Set up a policy association between the AMF and PCF associated with the UE. The AMF may obtain the policy for the UE from the PCF.

Step 87: The AMF sends the first information to an RAN network element. Optionally, the RAN network element executes a third related operation according to the first information (specifically, as described in the embodiment in FIG. 5).

Specifically, the AMF sends an initial context setup request message to the RAN network element. The initial context setup request message includes a registration response and/or the first information.

Step 88: The RAN network element conducts RRC reconfiguration on the first UE.

Step 89: The RAN network element returns initial UE context setup completion to the AMF.

Through this embodiment of the present disclosure, during initial access of first UE, the first UE provides first information for a network, and the network can determine an association relationship between the first UE and second UE, or an association relationship between the first UE and a second terminal device identity, thereby making it possible to support an operation regarding multi-card optimization.

Figure 8B:
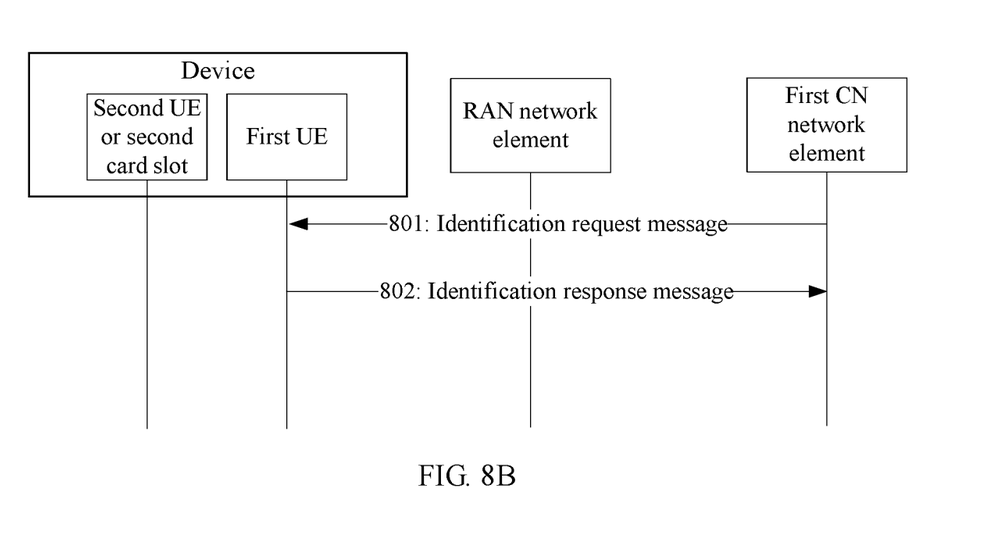
FIG. 8B is a flowchart of an identification request process according to a specific embodiment of the present disclosure.

Application scenario 3 according to an embodiment of the present disclosure:

Application scenario 3 according to the embodiment of the present disclosure takes first UE as an example, and mainly describes a process of requesting a device identity by a first CN network element, which includes the following steps, with reference to FIG. 8B:

Step 801: The first CN network element sends an identity request message to the first UE; where the identity request message may include an identity type requested.

Optionally, the identity type includes at least one of the following: a terminal device identity (such as an IMEI, or an IMEISV), a first terminal device identity, a second terminal device identity, a first terminal device identity and a second terminal device identity, all terminal device identify of a device. The first device is a device where the first UE is located.

Step 802: The first UE sends an identity response message to the first CN network element; where an identity type included in the identity response message may optionally be at least one of the following: an identity type, a first terminal device identity, and a second terminal device identity.

In an implementation manner, in the case that the identity type indicates "all terminal device identify of a device" or "a first terminal device identity and a second terminal device identity", the first UE sends the first terminal device identity and the second terminal device identity.

In another implementation manner, in the case that the identity type indicates "a terminal device identity" or "a first terminal device identity", the first UE sends the first terminal device identity.

In another implementation manner, in the case that the identity type indicates "a second terminal device identity", the first UE sends the second terminal device identity.

Figure 9:
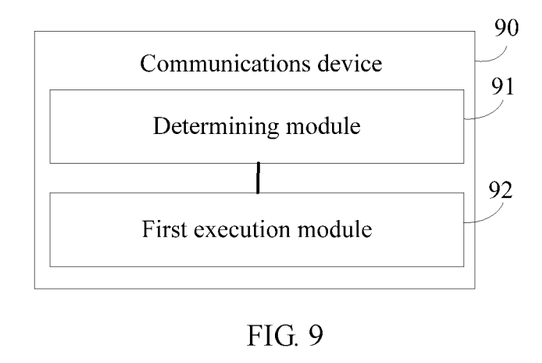
FIG. 9 is a schematic structural diagram of a communications device according to the present disclosure.

Referring to FIG. 9, an embodiment of the present disclosure provides a communications device, where the communications device is a first communications device. The first communications device may be, but is not limited to, at least one of the following: UE, a first device, a terminal device, first UE, and a first card. As shown in FIG. 9, the communications device 90 includes:

a determination module 91, configured to determine first information, where the first information includes at least one of the following: device identification information, related information of second UE, information of a CN network element of second UE; and the second UE is in an association relationship with first UE; and a first execution module 92, configured to execute a first related operation according to the first information.

Optionally, the device identification information includes at least one of the following:

a first terminal device identity and a second terminal device identity.

Optionally, the related information of the second UE includes at least one of the following:

a terminal device identity of the second UE, a UE identity of the second UE, a temporary UE identity of the second UE, and an identity of a CN network element of the second UE.

Optionally, the information of the CN network element of the second UE includes at least one of the following:

an address of the CN network element and an identity of the CN network element.

Optionally, the first execution module 92 is specifically configured to execute at least one of the following:

sending the first information when the first UE accesses a network;

setting the identity of the CN network element of the first UE to an identity of a CN network element of the second UE when sending an identity of a CN network element of the first UE;

selecting a cell for the first UE, where the selected cell is a serving cell of the second UE; and selecting a serving network for the first UE, where the selected serving network is a serving network of the second UE.

The communications device 90 can implement every process implemented in the method embodiments as shown in FIG. 2 of the present disclosure, and achieve a same beneficial effect. To avoid repetition, details are not described herein again.

Figure 10:
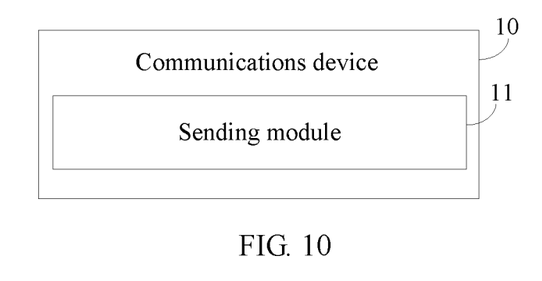
FIG. 10 is a schematic structural diagram of another communications device according to the present disclosure.

Referring to FIG. 10, an embodiment of the present disclosure provides a communications device, where the communications device is a second communications device. The second communications device may be, but is not limited to, at least one of the following: an AF (such as an AF of a terminal device manufacturer. In an implementation manner, the AF of the terminal device manufacturer may be a background server of the terminal device manufacturer), a UDR, a UDM. As shown in FIG. 10, the communications device 10 includes:

a sending module 11, configured to send device information of a first device;

where the device information of the first device includes at least one of the following:

a terminal device identity of the first device and UE identification information corresponding to a terminal device identity.

In this embodiment, the communications device 10 can implement every process implemented in the method embodiments as shown in FIG. 3 of the present disclosure, and achieve a same beneficial effect. To avoid repetition, details are not described herein again.

Figure 11:
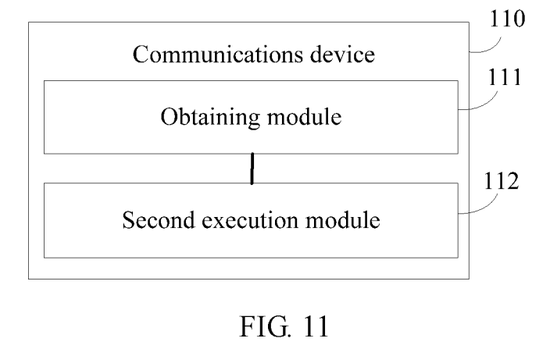
FIG. 11 is a schematic structural diagram of another communications device according to the present disclosure.

Referring to FIG. 11, an embodiment of the present disclosure provides a communications device, where the communications device is a third communications device. The third communications device may be, but is not limited to an RAN network element. As shown in FIG. 11, the communications device 110 includes:

an obtaining module 111, configured to obtain first information, where the first information includes at least one of the following: device identification information, related information of second UE, information of a CN network element of second UE; and the second UE is in an association relationship with first UE; and a second execution module 112, configured to execute a second related operation according to the first information.

Optionally, the second execution module 112 is specifically configured to execute at least one of the following:

selecting a CN network element for the first UE; and selecting a CN network element for the first UE, and sending information of the second UE to the selected CN network element.

In this embodiment, the communications device 110 can implement every process implemented in the method embodiments as shown in FIG. 4 of the present disclosure, and achieve a same beneficial effect. To avoid repetition, details are not described herein again.

Figure 12:
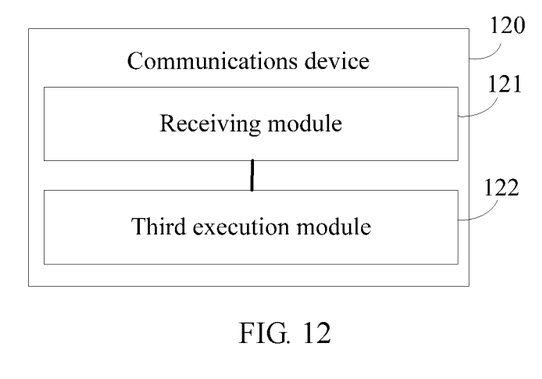
FIG. 12 is a schematic structural diagram of another communications device according to the present disclosure.

Referring to FIG. 12, an embodiment of the present disclosure provides a communications device, where the communications device is a fourth communications device.

The fourth communications device may be, but is not limited to a first CN network element (such as an MME or AMF), a third CN network element (such as a UDM or an HSS), and an RAN network element. As shown in FIG. 12, the communications device 120 includes:

a receiving module 121, configured to receive first information, where the first information includes at least one of the following: device identification information, related information of second UE, information of a CN network element of second UE; and the second UE is in an association relationship with first UE; and a third execution module 122, configured to execute a third related operation according to the first information.

Optionally, the device identification information includes at least one of the following:

a first terminal device identity and a second terminal device identity.

Optionally, the related information of the second UE includes at least one of the following:

a terminal device identity of the second UE, a UE identity of the second UE, a temporary UE identity of the second UE, and an identity of a CN network element of the second UE.

Optionally, the information of the CN network element of the second UE includes at least one of the following:

an address of the CN network element and an identity of the CN network element.

Optionally, the third execution module 122 is specifically configured to execute at least one of the following:

saving the first information;

setting up an association relationship between the first UE and the second UE;

setting up an association relationship between the first UE and a second terminal device identity;

setting up an association relationship between the first UE and a CN network element of the second UE;

setting up an association relationship between a first terminal device identity and a second terminal device identity;

acquiring related information of the second UE, where the second UE is in an association relationship with the first UE;

acquiring information of a second CN network element serving the second UE; determining whether there is a paging conflict between the first UE and the second UE; and sending the first information.

In this embodiment, the communications device 120 can implement every process implemented in the method embodiments as shown in FIG. 5 of the present disclosure, and achieve a same beneficial effect. To avoid repetition, details are not described herein again.

Figure 13:
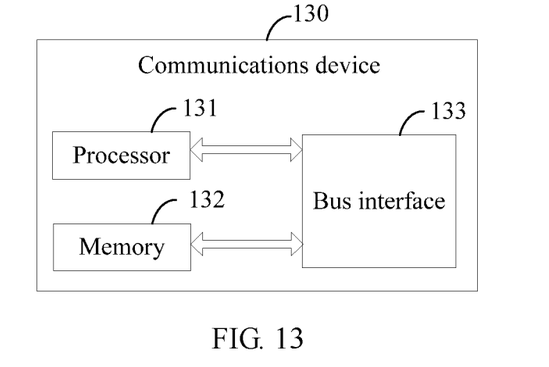
FIG. 13 is a schematic structural diagram of another communications device according to the present disclosure.

Referring to FIG. 13, FIG. 13 is a schematic structural diagram of another communications device according to an embodiment of the present disclosure. As shown in FIG. 13, a communications device 130 includes: a processor 131, a memory 132, and a computer program stored in the memory 132 and executable on the processor, where various components in the communications device 130 are coupled together through a bus interface 133. When the computer program is executed by the processor 131, each process implemented in the foregoing method embodiment as shown in FIG. 2 is implemented, or each process implemented in the foregoing method embodiment as shown in FIG. 3 is implemented, or each process implemented in the foregoing method embodiment as shown in FIG. 4 is implemented, or each process implemented in the foregoing method embodiment as shown in FIG. 5 is implemented, or each process implemented in the foregoing method embodiment as shown in FIG. 6 is implemented, and a same technical effect can be achieved. To avoid repetition, details are not described herein.

An embodiment of the present disclosure further provides a computer-readable storage medium. The computer-readable storage medium stores a computer program, and when a processor executes the computer program, the each process implemented in the foregoing method embodiment as shown in FIG. 2 is implemented, or each process implemented in the foregoing method embodiment as shown in FIG. 3 is implemented, or each process implemented in the foregoing method embodiment as shown in FIG. 4 is implemented, or each process implemented in the foregoing method embodiment as shown in FIG. 5 is implemented, or each process implemented in the foregoing method embodiment as shown in FIG. 6 is implemented, and a same technical effect can be achieved. To avoid repetition, details are not described herein. The computer-readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude presence of another same element in a process, method, article, or apparatus that includes the element.

By means of the foregoing description of the embodiments, a person skilled in the art may clearly understand that the method in the foregoing embodiments may be implemented by software with a necessary general hardware platform. The method in the foregoing embodiments may also be implemented by hardware. However, in many cases, the former is a preferred implementation. Based on such an understanding, the technical solutions of the present disclosure essentially or the part contributing to existing technologies may be implemented in a form of a software product. The computer software product is stored in a storage medium (for example, a ROM/RAM, a magnetic disk, or an optical disc) and includes several instructions for instructing a terminal (which may be mobile phone, a computer, a sever, an air conditioner, a network device, or the like) to execute the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A method for supporting user equipment UE association, applied to a first communications device being at least one of the following: UE, a first device, a terminal device, first UE or a first card, and comprising:

determining first information, wherein the first information comprises at least one of the following: device identification information, related information of second UE, or information of a core network CN network element of second UE; and the second UE is in an association relationship with first UE; wherein the device identification information comprises a first terminal device identity and a second terminal device identity; wherein the first terminal device identity and the second terminal device identity are one of following case:

the first terminal device identity is a terminal device identity of the first UE, the second terminal device identity is a terminal device identity associated with the first UE;

the first terminal device identity is a terminal device identity of the first UE, the second terminal device identity is a terminal device identity of the second UE;

wherein the first UE and the second UE are located on a same device; and executing a first related operation according to the first information;

wherein the executing a first related operation according to the first information comprises at least one of the following:

sending the first information when the first UE accesses a network; or setting the identity of the CN network element of the first UE to an identity of a CN network element of the second UE when sending an identity of a CN network element of the first UE.

2. The method according to claim 1, wherein the related information of the second UE comprises at least one of the following:

a terminal device identity of the second UE, a UE identity of the second UE, a temporary UE identity of the second UE, or an identity of a CN network element of the second UE.

3. The method according to claim 1, wherein the information of the CN network element of the second UE comprises at least one of the following:

an address of the CN network element of the second UE or an identity of the CN network element of the second UE.

4. The method according to claim 1, wherein the executing a first related operation according to the first information further comprises at least one of the following:

selecting a cell for the first UE, wherein the selected cell is a serving cell of the second UE; or, selecting a serving network for the first UE, wherein the selected serving network is a serving network of the second UE.

5. A communications device, comprising: a processor, a memory, and a program that is stored in the memory and executable on the processor, wherein when the program is executed by the processor, steps of the method for supporting user equipment UE association according to claim 1 are implemented.

6. The communications device according to claim 5, wherein the device identification information comprises at least one of the following:

a first terminal device identity or a second terminal device identity.

7. The communications device according to claim 5, wherein the related information of the second UE comprises at least one of the following:

a terminal device identity of the second UE, a UE identity of the second UE, a temporary UE identity of the second UE, or an identity of a CN network element of the second UE.

8. The communications device according to claim 5, wherein the executing a first related operation according to the first information further comprises at least one of the following:
   selecting a cell for the first UE, wherein the selected cell is a serving cell of the second UE; or,
   selecting a serving network for the first UE, wherein the selected serving network is a serving network of the second UE.

9. The communications device according to claim 5, wherein the information of the CN network element of the second UE comprises at least one of the following:
   an address of the CN network element of the second UE or an identity of the CN network element of the second UE.

10. A method for supporting user equipment UE association, applied to a third communications device, and comprising:
   obtaining first information, wherein the first information comprises at least one of the following: device identification information, related information of second UE, or information of a core network CN network element of second UE; and the second UE is in an association relationship with first UE; wherein the device identification information comprises a first terminal device identity and a second terminal device identity; wherein the first terminal device identity and the second terminal device identity are one of following case:
   the first terminal device identity is a terminal device identity of the first UE, the second terminal device identity is a terminal device identity associated with the first UE;
   the first terminal device identity is a terminal device identity of the first UE, the second terminal device identity is a terminal device identity of the second UE;
   wherein the first UE and the second UE are located on a same device; and
   executing a second related operation according to the first information;
   wherein the executing a second related operation according to the first information comprises at least one of the following:
   selecting a CN network element for the first UE, wherein the CN network element is a CN network element of the second UE; or,
   selecting a CN network element for the first UE, and sending information of the second UE to the selected CN network element.

11. A communications device, comprising: a processor, a memory, and a program that is stored in the memory and executable on the processor, wherein when the program is executed by the processor, steps of the method for supporting UE association according to claim 10 are implemented.

12. The method according to claim 10, wherein the third communications device comprises an Radio Access Network (RAN) network element.

13. A method for supporting user equipment UE association, applied to a fourth communications device, and comprising:
   receiving first information, wherein the first information comprises at least one of the following: device identification information, related information of second UE, or information of a core network CN network element of second UE; and the second UE is in an association relationship with first UE; wherein the device identification information comprises a first terminal device identity and a second terminal device identity; wherein the first terminal device identity and the second terminal device identity are one of following case:
   the first terminal device identity is a terminal device identity of the first UE, the second terminal device identity is a terminal device identity associated with the first UE;
   the first terminal device identity is a terminal device identity of the first UE, the second terminal device identity is a terminal device identity of the second UE;
   wherein the first UE and the second UE are located on a same device; and
   executing a third related operation according to the first information;
   wherein the executing a third related operation according to the first information comprises at least one of the following:
   setting up an association relationship between the first UE and a CN network element of the second UE;
   acquiring information of a second CN network element serving the second UE.

14. The method according to claim 13, wherein the related information of the second UE comprises at least one of the following:
   a terminal device identity of the second UE, a UE identity of the second UE, a temporary UE identity of the second UE, or an identity of a CN network element of the second UE.

15. The method according to claim 13, wherein the information of the CN network element of the second UE comprises at least one of the following:
   an address of the CN network element or an identity of the CN network element.

16. The method according to claim 13, wherein the executing a third related operation according to the first information further comprises at least one of the following:
   saving the first information;
   setting up an association relationship between the first UE and the second UE;
   setting up an association relationship between the first UE and a second terminal device identity;
   setting up an association relationship between a first terminal device identity and a second terminal device identity;
   acquiring related information of the second UE, wherein the second UE is in an association relationship with the first UE;
   determining whether there is a paging conflict between the first UE and the second UE; or,
   sending the first information.

17. A communications device, comprising: a processor, a memory, and a program that is stored in the memory and executable on the processor, wherein when the program is executed by the processor, steps of the method for supporting UE association according to claim 13 are implemented.

18. The communications device according to claim 17, wherein the executing a third related operation according to the first information comprises at least one of the following:
   saving the first information;
   setting up an association relationship between the first UE and the second UE;
   setting up an association relationship between the first UE and a second terminal device identity;

setting up an association relationship between a first terminal device identity and a second terminal device identity;

acquiring related information of the second UE, wherein the second UE is in an association relationship with the first UE;

determining whether there is a paging conflict between the first UE and the second UE; or, sending the first information.

19. The communications device according to claim 17, wherein the information of the CN network element of the second UE comprises at least one of the following:

an address of the CN network element or an identity of the CN network element.

20. The method according to claim 13, wherein the fourth communications device comprises a CN network element or an RAN network element.

* * * * *